(12) United States Patent
Furukawa et al.

(10) Patent No.: US 8,400,641 B2
(45) Date of Patent: Mar. 19, 2013

(54) INTERFEROMETER FOR ASPHERICAL OR SPHERICAL SURFACE MEASUREMENTS

(75) Inventors: Yasunori Furukawa, Utsunomiya (JP); Tokuyuki Honda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 171 days.

(21) Appl. No.: 12/904,929

(22) Filed: Oct. 14, 2010

(65) Prior Publication Data

US 2011/0090510 A1 Apr. 21, 2011

(30) Foreign Application Priority Data

Oct. 20, 2009 (JP) ................................. 2009-241694

(51) Int. Cl.
*G01B 11/02* (2006.01)
*G01B 9/02* (2006.01)

(52) U.S. Cl. ........................ 356/511; 356/495

(58) Field of Classification Search .................. 356/450, 356/453, 458, 520, 511–514
See application file for complete search history.

(56) References Cited

U.S. PATENT DOCUMENTS

| | | | | |
|---|---|---|---|---|
| 4,743,118 A * | 5/1988 | Tsuchiya et al. | ............ | 356/520 |
| 6,456,382 B2 * | 9/2002 | Ichihara et al. | ............ | 356/513 |
| 6,714,308 B2 * | 3/2004 | Evans et al. | ............ | 356/513 |
| 6,965,435 B2 * | 11/2005 | Ina | ............ | 356/513 |
| 8,045,175 B2 * | 10/2011 | De Groot et al. | ............ | 356/497 |
| 8,101,895 B2 * | 1/2012 | Aoki | ............ | 250/201.9 |
| 2003/0043385 A1 | 3/2003 | Kuchel | | |

FOREIGN PATENT DOCUMENTS

| | | |
|---|---|---|
| JP | 2000-097654 A | 4/2000 |
| JP | 2004-534245 T | 11/2004 |

* cited by examiner

*Primary Examiner* — Kara E Geisel
*Assistant Examiner* — Hina F Ayub
(74) *Attorney, Agent, or Firm* — Canon U.S.A., Inc. IP Division

(57) ABSTRACT

An interferometer that measures a shape of a surface of an inspection object includes an interference optical system that splits light from a light source into inspection light and reference light and causes the inspection light reflected by the surface of the inspection object and the reference light to interfere with each other, and a photoelectric conversion element that detects interference fringes produced by interference between the inspection light and the reference light. The interference optical system includes a first optical element that transmits and reflects the inspection light, a second optical element that reflects the inspection light, and a moving unit configured to move the second optical element. The inspection light passes through the first optical element, is reflected by the second optical element, is reflected by the first optical element, and is then incident on the surface of the inspection object.

13 Claims, 6 Drawing Sheets

INTERFEROMETER FOR ASPHERICAL OR SPHERICAL SURFACE MEASUREMENTS

BACKGROUND OF THE INVENTION

1. Field of the Invention

The present invention relates to an interferometer, and more specifically to an interferometer configured to measure the shape of an optical surface.

2. Description of the Related Art

An interferometer is used for measuring the shape of the surface of a mirror or a lens with a high degree of accuracy. However, if an aspherical surface is measured with an interferometer that uses a flat surface or a spherical surface as a reference surface, the phase difference between reference light and inspection light is large, and therefore the fringe density of interference fringes is high and exceeds the resolution of a photoelectric conversion element that detects interference fringes. An interferometric scanning method has been proposed in which an inspection surface of an inspection object is moved in the optical axis direction, only a part of the inspection surface is measured at a time, and the measurement results are stitched together to measure the shape of the entire inspection surface. An example of this method is described in Japanese Patent Application Publication No. 2004-534245 (JP 2004-534245), which has also been published in the English language as WO03006920 (A1).

However, in the method described in JP 2004-534245, the total length of an interferometer needs to be long to measure a surface having a large curvature radius. This increases a measuring error due to air fluctuation or vibration. An alternative method is disclosed in Japanese Patent Application Laid-Open No. 2000-97654 (JP 2000-97654) in which a compact point-diffraction interferometer using a reflecting surface is proposed.

The interferometer described in JP 2000-97654 measures the shape of an inspection surface by making an apparent point light source at a position distant from the inspection surface with a reflecting surface. The distance between the apparent point light source and the inspection surface is equal to the curvature radius of the inspection surface.

However, the interferometer described in JP 2000-97654 requires an opening in the inspection surface, which complicates the measurement of the inspection surface.

SUMMARY OF THE INVENTION

The present invention provides an interferometer that can accurately measure the shape of an inspection surface having a large curvature radius without using complicated measuring arrangements.

In an aspect of the present invention, an interferometer that measures the shape of a surface of an inspection object includes an interference optical system that splits light from a light source into inspection light and reference light and causes the inspection light reflected by the surface of the inspection object and the reference light to interfere with each other, and a photoelectric conversion element that detects interference fringes produced by interference between the inspection light and the reference light. The interference optical system includes a first optical element that transmits and reflects the inspection light, a second optical element that reflects the inspection light, and a moving unit configured to move the second optical element. The inspection light passes through the first optical element, is reflected by the second optical element, is reflected by the first optical element, and is then incident on the surface of the inspection object.

Further features of the present invention will become apparent to persons having ordinary skill on the art from the following description of exemplary embodiments with reference to the attached drawings.

DESCRIPTION OF THE EMBODIMENTS

The embodiments of the present invention will now be described in detail with reference to the accompanying drawings.

First Embodiment

Figure 1:
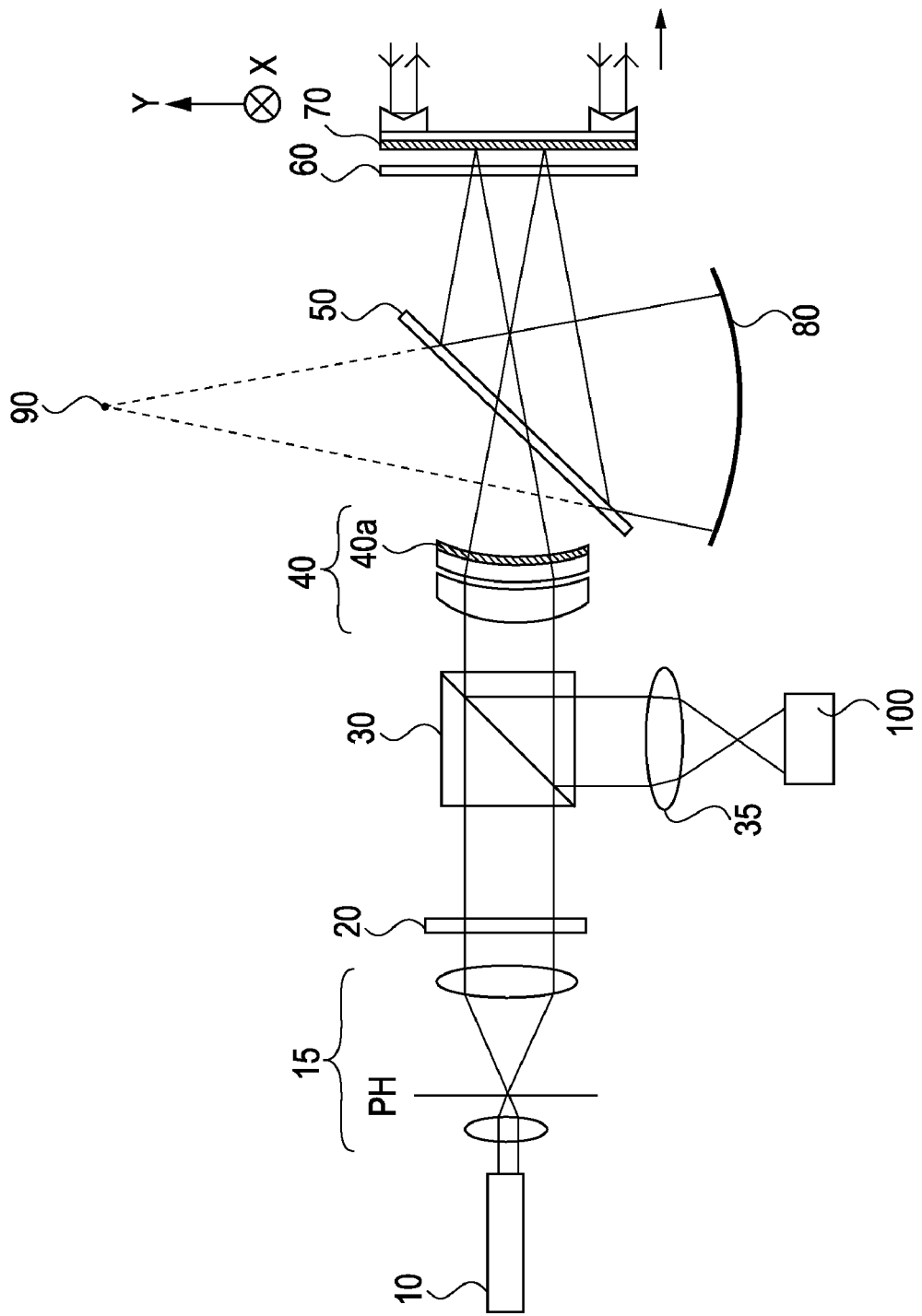
FIG. 1 is an explanatory view of a first embodiment of the present invention.

FIG. 1 is a view showing the general structure of an interferometer according to a first embodiment of the present invention. In this embodiment, the interferometer is a Fizeau interferometer. The interferometer includes a light source 10, an interference optical system, and a detector 100. The interference optical system includes a collimator lens group 15, a polarizer 20, a beam splitter 30, a lens 35, a collecting lens 40, a polarization beam splitter (first optical element) 50, a quarter wave plate 60, and a flat mirror (second optical element) 70. A stop PH having a pinhole is disposed in the optical path of the collimator lens group 15, so as to regulate the amount of light passing therethrough. The collecting lens 40 (Fizeau lens) includes a reference surface 40a. The flat mirror 70 can be moved by a moving unit (not shown) in the direction of the optical axis of the interference optical system. The moving distance of the flat mirror 70 is measured by a length measuring device (not shown), such as an interferometer or an encoder.

The light source 10 is a highly coherent laser. Light emitted from the light source 10 is collimated by the collimator lens group 15 and is linearly polarized by the polarizer 20. This linearly polarized light will be called X-linearly polarized light for the sake of convenience. Light passing through the beam splitter 30 and reflected by the reference surface 40a of the collecting lens 40 becomes a parallel light beam after exiting the collecting lens 40. The parallel light beam after exiting the collecting lens 40 is reflected by the beam splitter 30, passes through the lens 35, and is incident on the detector 100. This light serves as reference light.

On the other hand, light passing through the reference surface 40a becomes a spherical wave, passes through the polarization beam splitter 50, then passes through the quarter wave plate 60, and becomes circularly polarized. The circularly polarized light is reflected by the flat mirror 70 and passes through the quarter wave plate 60 again, thereby becoming Y-linearly polarized. The Y-linearly polarized light is reflected by the polarization beam splitter 50 and is incident on an inspection surface 80 of an inspection object. The light reflected by the inspection surface 80 is reflected by the polarization beam splitter 50, passes through the quarter wave plate 60, and becomes circularly polarized. The circularly polarized light is reflected by the flat mirror 70, passes through the quarter wave plate 60 again, becomes X-linearly polarized. The X-linearly polarized light passes through the polarization beam splitter 50, is reflected by the beam splitter 30, passes through the lens 35, and is incident on the detector 100. This light serves as inspection light. The inspection light is combined with the reference light reflected by the reference surface 40a and forms interference fringes on the light receiving surface of the detector 100. The inspection light reflected by the inspection surface 80 travels back along the optical path along which the inspection light travels before being incident on the inspection surface 80, and interferes with the reference light. The polarization directions of the X-linearly polarized light and the Y-linearly polarized light are perpendicular to each other.

The detector 100 is a photoelectric conversion element (a CCD sensor, a CMOS sensor, or the like). The detector 100 takes an image of the interference fringes. The reference surface 40a is what is called a Fizeau surface. The reference surface 40a splits light from the light source 10 into inspection light and reference light and combines the inspection light reflected by the inspection surface 80 and the reference light so as to cause them to interfere with each other.

To obtain the phase (the optical path difference between the reference light and the inspection light) from the interference fringes, a known fringe scan method is used. Specifically, for example, the reference surface is moved in the optical axis direction by $\lambda/4$ at a time, each time an image of interference fringes is taken, and from a plurality of image data of interference fringes, the phase is calculated in a calculator unit (not shown). For example, signals corresponding to the interference fringes detected by detector 100 may be input into any commercially available signal processing device, such as an oscilloscope or computer, where the phase of the interference fringes can be calculated and processed in a known manner. By processing phase data of each point on the inspection surface in the calculator, the shape of the inspection surface 80 can be accurately calculated.

The curvature radius of the inspection surface 80 is denoted by R. The distance between the flat mirror 70 and the center of the polarization beam splitter 50 is denoted by L. The distance between the center of the polarization beam splitter 50 and the inspection surface 80 is denoted by D. The apparent light collection point (point light source) 90 is located at a position at a distance D+2L from the inspection surface 80. Therefore, it can be considered that a spherical wave emitted from the position of the point light source is incident on the inspection surface 80. Therefore, when R is equal to D+2L, null interference fringes are obtained. Because light passes through the collecting lens 40 and is collected before being incident on the quarter wave plate 60, the actual light collection point is located between the collecting lens 40 and the quarter wave plate 60. In this embodiment, the positional relationship between the polarization beam splitter 50 and the actual light collection point is not particularly limited to any specific dimensions.

When the inspection surface 80 is aspherical, the optical path difference between the reference light and the inspection light can be too large in a region other than a region where light is incident almost perpendicularly on the aspherical surface (inspection surface 80). That is, in a region where the approximate curvature radius is not equal to D+2L, the optical path difference between the reference light and the inspection light can become too large for accurate measurement. For this reason, the interference fringes can be too dense to be measured by the detector 100. Therefore, in the interferometer of this embodiment, first, only a region where light is incident almost perpendicularly on the inspection surface 80 is measured. Next, the flat mirror 70 is moved a distance $\Delta L$ in the optical axis direction, and measurement is performed again. Moving the flat mirror 70 a distance $\Delta L$ in the optical axis direction moves the apparent light collection point 90 a distance $2\Delta L$ and causes light to be incident perpendicularly on a region of the inspection surface 80 where the curvature radius is $D+2L+2\Delta L$. Accordingly, the neighborhood of the region is measured. By repeating the steps of moving the flat mirror 70 and performing measurement, and synthesizing (stitching together) a plurality of phase data obtained, the shape of the entire inspection surface 80 is measured.

The moving distance $\Delta L$ of the flat mirror 70 can be easily measured, whereas it is difficult to accurately measure D and L. So, first, the value of D+2L is temporarily determined, and the shape of the inspection surface is measured. Next, the value of D+2L is changed such that the measurement result becomes closer to the design value, and the shape of the inspection surface is measured again. By repeating such operations, the shape of the inspection surface 80 may be accurately obtained.

The shape of the entire surface of the inspection surface may also be measured from a plurality of phase data obtained by changing the position of the apparent light collection point 90 by inclining the flat mirror 70 to the optical axis instead of moving the flat mirror 70 in the optical axis direction. In this manner, the inspection surface 80 can be easily measured even when it is a free-form surface.

Because the moving distance of the apparent light collection point is twice that of the reflecting surface, the interferometer of this embodiment can measure an inspection surface having a larger amount of asphericity. In addition, because instead of moving the inspection surface, the reflecting surface provided separately is moved, the interferometer of this embodiment is simplified. Moreover, because polarized light is used, the entire inspection surface including the center thereof can be easily measured.

Second Embodiment

Figure 2:
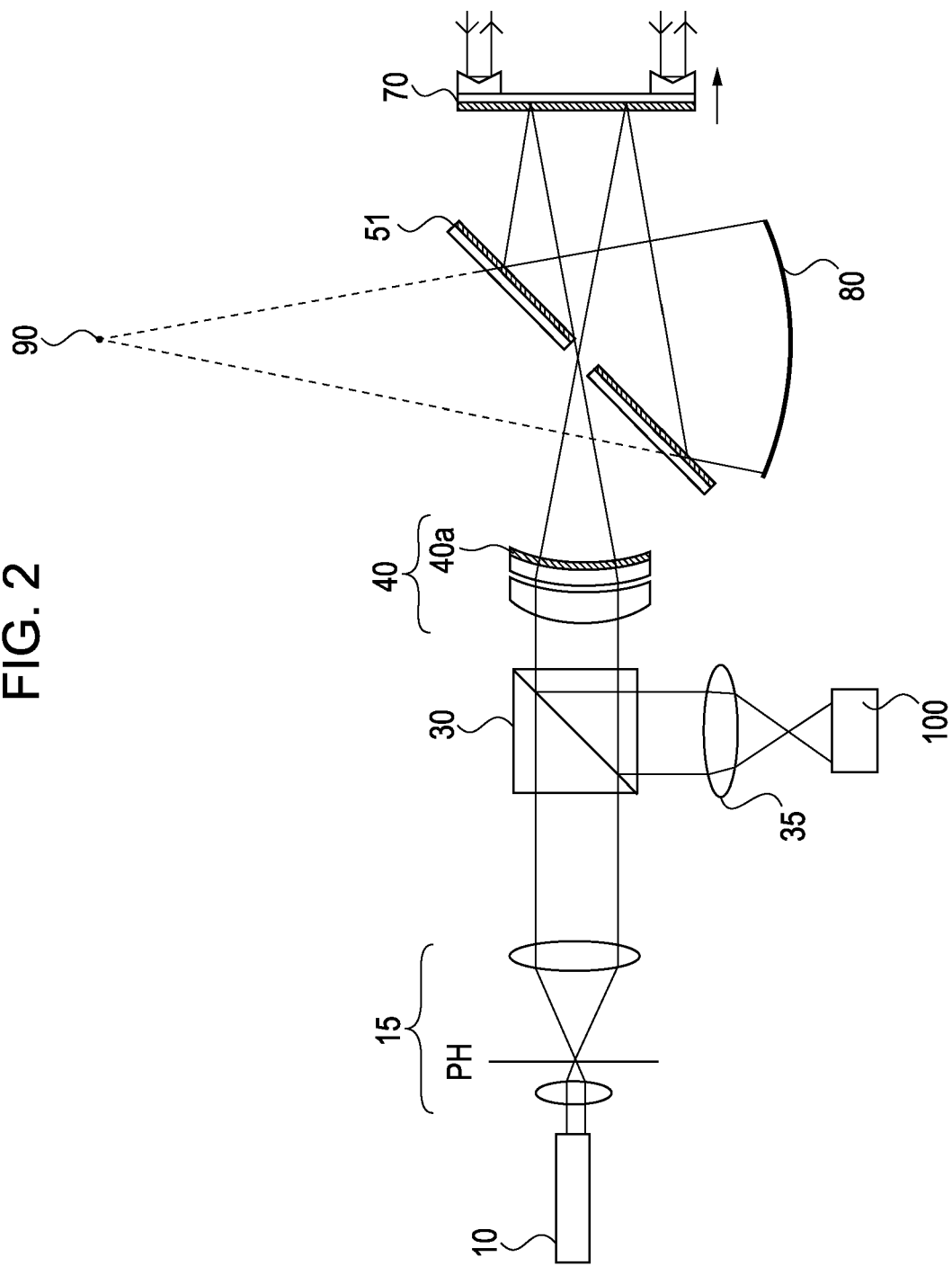
FIG. 2 is an explanatory view of a second embodiment of the present invention.

FIG. 2 is a view showing the general structure of an interferometer according to a second embodiment of the present invention. The same reference numerals will be used to designate the same components as those in the first embodiment, and the description thereof will be omitted.

The interferometer of this embodiment differs from that of the first embodiment in the structure between the reference surface 40a and the inspection surface 80. Specifically, instead of the polarization beam splitter and the quarter wave plate, it uses a flat mirror 51 (first optical element) disposed near the position where inspection light is collected.

In the interferometer of this embodiment, light passing through the reference surface 40a becomes a spherical wave, passes through an opening of the flat mirror 51, is reflected by the flat mirror 70, is then reflected by the flat mirror 51, and is incident on the inspection surface 80. The light reflected by the inspection surface 80 is reflected by the flat mirror 51, is reflected by the flat mirror 70, passes through the opening of the flat mirror 51, passes through the collecting lens 40, the beam splitter 30, and the lens 35, and is incident on the detector 100. For this reason, in this embodiment, the actual light collection point is located near the opening of the flat mirror 51 so that light passing through the reference surface 40a can pass through the opening of the flat mirror 51.

The flat mirror 51 has a reflectivity close to 100% except for the opening. The size of the opening depends on the NA (Numerical Aperture) of the inspection surface 80 and the amount of aberration of the inspection light, and is larger than the light collection spot of the inspection light having aberration. For example, when the wavelength of the light source is 633 nm and the NA is 0.1, the size of the opening is at least 10 μm but no more than 1000 μm. Instead of making an opening in the flat mirror 51, an AR (antireflection) coating may be applied to the flat mirror 51.

Unlike the interferometer of the first embodiment, the interferometer of this embodiment need not use a polarization element. The number of parts of the interferometer of this embodiment is smaller than that of the interferometer of the first embodiment. Therefore, the interferometer of the this embodiment can be produced at low cost and easily.

Third Embodiment

Figure 3:
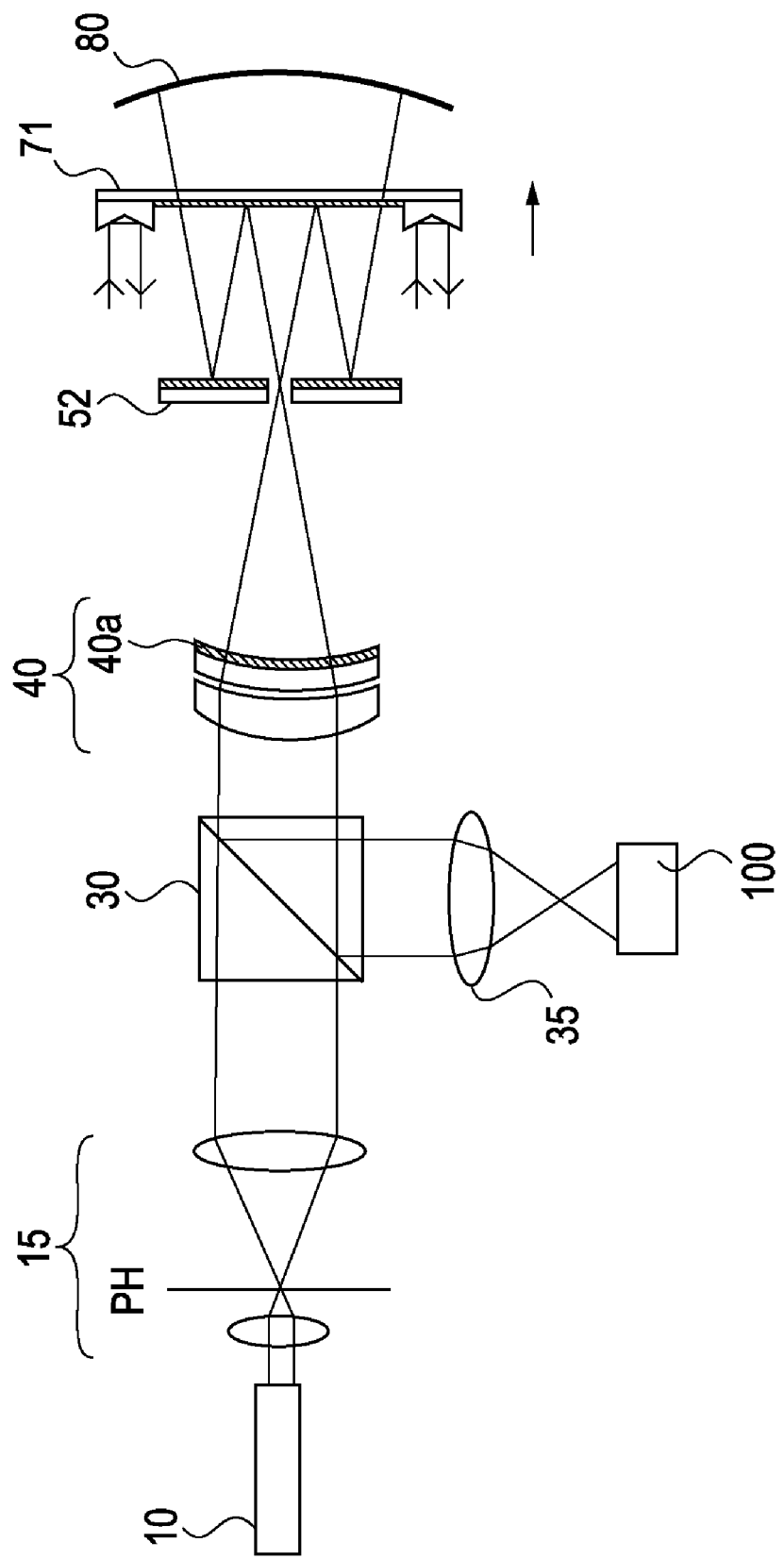
FIG. 3 is an explanatory view of a third embodiment of the present invention.

FIG. 3 is a view showing the general structure of an interferometer according to a third embodiment of the present invention. The same reference numerals will be used to designate the same components as those in the first embodiment, and the description thereof will be omitted.

The interferometer of this embodiment differs from the interferometer of the first embodiment in the structure between the reference surface 40a and the inspection surface 80. The interferometer includes a flat mirror 52 (first optical element) having an opening, a half mirror 71 (second optical element), a moving mechanism that moves the half mirror 71 in the direction of the optical axis of the interference optical system, and a length measuring device that measures the moving distance of the half mirror 71.

The inspection light passing through the reference surface 40a becomes a spherical wave and passes through an opening of the flat mirror 52. The opening is disposed at the light collection point of the spherical wave. After that, the inspection light is reflected by the half mirror 71, is reflected by the flat mirror 52, passes through the half mirror 71, and is then incident on the inspection surface 80. The light reflected by the inspection surface 80 passes through the half mirror 71, is then reflected by the flat mirror 52, is reflected by the half mirror 71, passes through the opening of the flat mirror 52, then passes through the collecting lens 40, the beam splitter 30, and the lens 35, and is incident on the detector 100.

The flat mirror 52 has a reflectivity close to 100% except for the opening. The size of the opening depends on the NA of the inspection surface 80 and the amount of aberration of the inspection light, and is larger than the light collection spot of the inspection light having aberration. Instead of making an opening in the flat mirror 52, an AR coating may be applied to the flat mirror 52.

Figure 4:
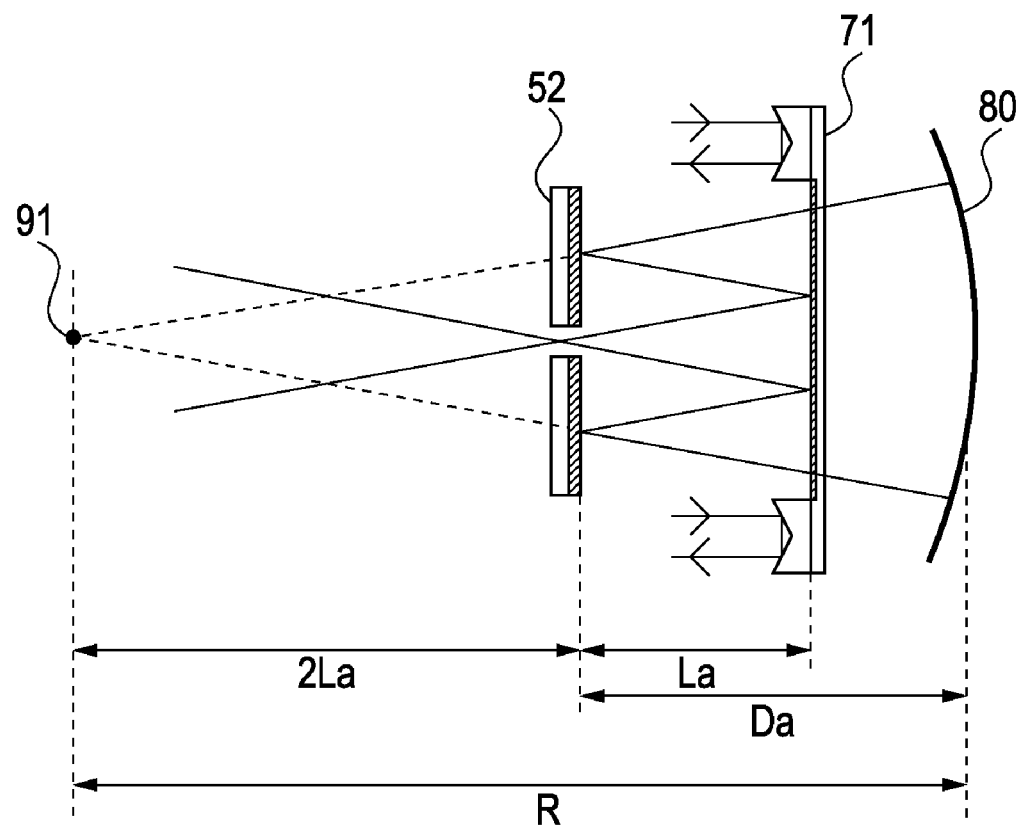
FIG. 4 is a view showing the position of the apparent light collection point.

Reference is made to FIG. 4. The distance between the flat mirror 52 and the half mirror 71 is denoted by La. The distance between the flat mirror 52 and the inspection surface 80 is denoted by Da. The apparent light collection point (point light source) 91 is located at a position at a distance Da+2La from the inspection surface 80. When the curvature radius R of the inspection surface 80 is equal to Da+2La, null interference fringes are obtained. The total length of this interferometer is shorter than that of a conventional interferometer by 2La.

Inspection light other than that described above, for example, inspection light that first passes through the half mirror 71 without being reflected, is reflected by the inspection surface 80 and then passes through the half mirror 71. However, because the curvature radius R differs greatly from Da, most of the inspection light passing through the half mirror 71 does not pass through the opening of the flat mirror 52 and does not cause a measuring error.

Moving the half mirror 71 closer to the inspection surface 80 by ΔLa in the direction of the optical axis of the interference optical system locates the apparent light collection point 91 at a position at a distance Da+2La+2ΔLa from the inspection surface 80. Therefore, in that case, a region of the inspection surface 80 having a curvature radius almost equal to Da+2La+2ΔLa can be measured. By repeating the steps of moving the half mirror 71 in the optical axis direction and performing measurement, and stitching together a plurality of phase data obtained, the shape of the entire inspection surface 80 is measured.

In calculation, the spherical term of the inspection light due to the thickness of the half mirror 71 is deducted. In addition, the shape errors of the flat mirror 52 and the half mirror 71 are measured separately and corrected. The reflectivity of the reference surface is determined such that the reference light and the inspection light incident on the detector 100 have the same light intensity.

When the neighborhood of the center of the inspection surface 80 is measured, a plurality of types of inspection light pass through the opening of the flat mirror 52, and therefore the shape of the inspection surface 80 is difficult to measure precisely. The term "a plurality of types of inspection light" means, for example, light passing through the half mirror 71, reflected by the inspection surface 80, and passing though the half mirror 71, and light reflected only by the half mirror 71.

So, when the neighborhood of the center of the inspection surface 80 is measured with the interferometer of this embodiment, the half mirror 71 is removed from the optical path. Such measurement can be performed because the neighborhood of the center of the inspection surface 80 can be considered to be almost a flat surface.

Unlike the interferometer of the first embodiment, the interferometer of this embodiment need not use a polarization element. The number of parts of the interferometer of this embodiment is smaller than that of the interferometer of the first embodiment. Therefore, the interferometer of the this embodiment can be produced at low cost and easily. In addition, because the flat mirror is disposed perpendicular to the optical axis of the interference optical system, the interferometer of this embodiment can be further reduced in size.

Fourth Embodiment

Figure 5:
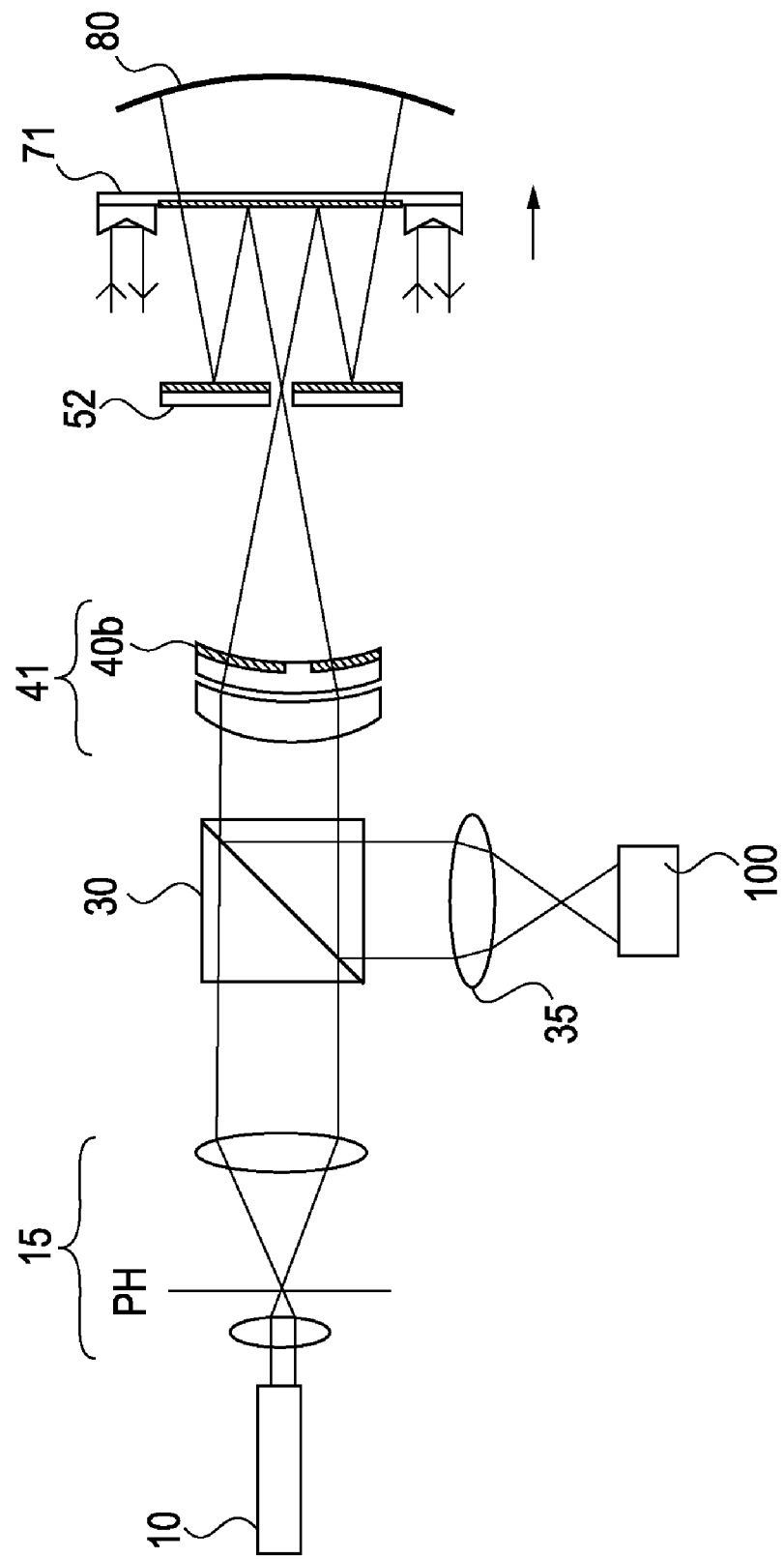
FIG. 5 is an explanatory view of a fourth embodiment of the present invention.

FIG. 5 is a view showing the general structure of an interferometer according to a fourth embodiment of the present invention. The same reference numerals will be used to designate the same components as those in the third embodiment, and the description thereof will be omitted.

The interferometer of this embodiment differs from that of the third embodiment in that instead of the collecting lens 40, a collecting lens 41 is used. An AR coating is applied to the central part (the neighborhood of the optical axis) of a reference surface 40b. The reflectivity of the central part is smaller than the reflectivity of the peripheral part.

When measuring the neighborhood of the center of the inspection surface 80, the interferometer of this embodiment uses light reflected by the half mirror 71 as reference light and uses light passing through the half mirror 71, reflected by the inspection surface 80, and passing through the half mirror 71 as inspection light. The method to measure the area of the inspection surface 80 other than the neighborhood of the center thereof in this embodiment is the same as that in the third embodiment.

Unlike the interferometer of the third embodiment, the interferometer of this embodiment need not insert and remove the half mirror 71 and therefore can be produced at low cost and easily and can be reduced in size.

In each of the embodiments, the inspection surface does not have a constant curvature radius, that is to say, it is an aspherical surface. However, the inspection surface is not limited to an aspherical surface and may be a spherical surface. By using the interferometers of the present invention, the shape of an inspection surface having a large curvature radius can be easily measured.

Figure 6:
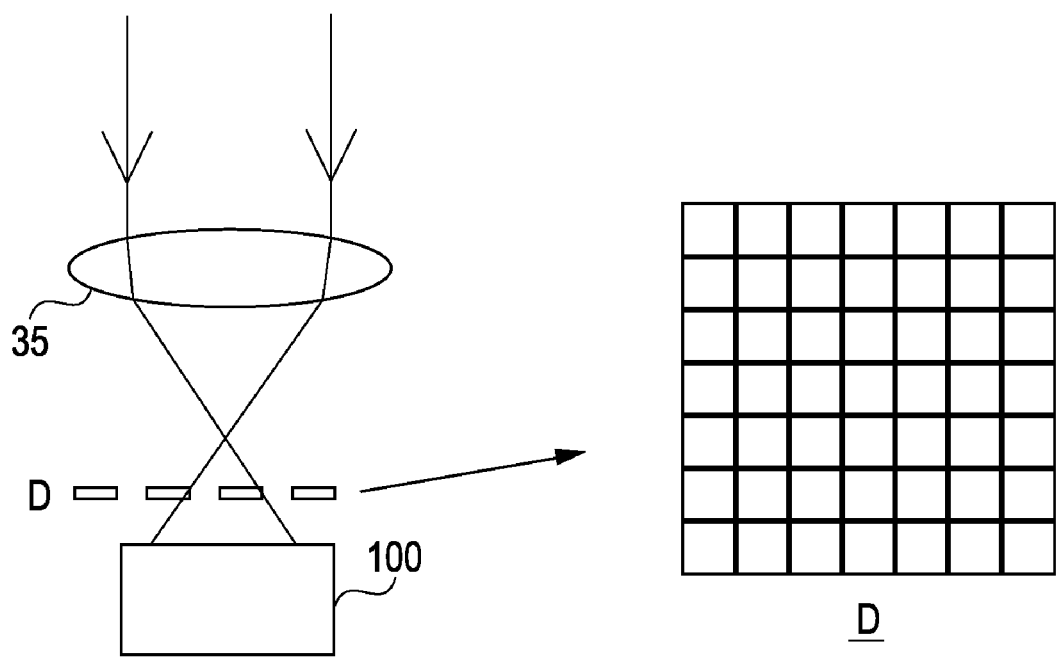
FIG. 6 is an explanatory view of a shearing interferometer.

In the above-described embodiments, the present invention is applied to a Fizeau interferometer. However, the present invention may be applied to other types of interferometers such as a Twyman-Green interferometer and a shearing interferometer. A shearing interferometer does not need a reference surface. By disposing a diffraction grating D in front of a detector 100 as shown in FIG. 6 and measuring interference of diffracted light, the shape of an inspection surface can be measured. A shearing interferometer splits inspection light into a plurality of split light beams and causes the split light beams to interfere with each other on the detector 100. In FIG. 6, a two-dimensional diffraction grating D is used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-241694 filed Oct. 20, 2009, which is hereby incorporated by reference herein in its entirety.

What is claimed is:

1. An interferometer that measures the shape of a surface of an inspection object, the interferometer comprising:
  an interference optical system that splits light from a light source into inspection light and reference light and causes the inspection light reflected by the surface of the inspection object and the reference light to interfere with each other; and
  a photoelectric conversion element that detects interference fringes produced by the interference of the inspection light and the reference light,
  wherein the interference optical system includes a first optical element that transmits and reflects the inspection light and has a flat reflecting surface, a second optical element that reflects the inspection light, and a moving unit configured to move the second optical element,
  wherein the inspection light passes through the first optical element, is reflected by the second optical element, is reflected by the first optical element, and is then incident on the surface of the inspection object, and
  wherein the inspection light reflected by the surface of the inspection object is reflected by the first optical element, is reflected by the second optical element, passes through the first optical element, and interferes with the reference light.

2. The interferometer according to claim 1, wherein the surface of the inspection object is an aspherical surface.

3. The interferometer according to claim 1, wherein the moving unit changes the position of the second optical element in the direction of the optical axis of the interference optical system and thereby changes a region of the surface of the inspection object on which the inspection light is perpendicularly incident.

4. The interferometer according to claim 1, wherein the moving unit changes the inclination of the second optical element to the optical axis of the interference optical system and thereby changes a region of the surface of the inspection object on which the inspection light is perpendicularly incident.

5. The interferometer according to claim 1, wherein the interference optical system has a quarter wave plate disposed in the optical path between the first optical element and the second optical element, the first optical element includes a polarization beam splitter that is inclined to the optical axis of the interference optical system, and the flat reflecting surface of the second optical element is perpendicular to the optical axis.

6. The interferometer according to claim 1, wherein the first optical element is disposed near the position where the inspection light is collected and includes an opening through which the inspection light passes and a reflecting surface that reflects the inspection light, the reflecting surface of the first optical element is flat and perpendicular to the optical axis of the interference optical system, the flat reflecting surface of the second optical element is a half mirror and is perpendicular to the optical axis, and the inspection light reflected by the reflecting surface of the first optical element passes through the flat reflecting surface of the second optical element and is incident on the surface of the inspection object.

7. The interferometer according to claim 1, wherein the first optical element is disposed near the position where the inspection light is collected and includes an opening through which the inspection light passes and a reflecting surface that reflects the inspection light, the reflecting surface of the first optical element is flat and inclined to the optical axis of the interference optical system, and the flat reflecting surface of the second optical element is perpendicular to the optical axis.

8. The interferometer according to claim 6, further comprising;
  a reference surface on which the reference light is formed,
  wherein a reflectivity near an optical axis of the reference surface is smaller than a reflectivity of a peripheral part of the reference surface, and
  wherein the photoelectric conversion element detects interference fringes produced by interference between light from the light source reflected by the flat reflecting surface of the second optical element and light from the light source reflected by a region of the surface of the inspection object near the optical axis of the interference optical system.

9. The interferometer according to claim 8, further comprising a calculating unit configured to calculate the shape of the surface of the inspection object on the basis of the interference fringes detected by the photoelectric conversion element, wherein the calculating unit calculates the shape of the region of the surface of the inspection object near the optical axis on the basis of the interference fringes detected by the photoelectric conversion element.

10. The interferometer according to claim 1, wherein the inspection light reflected by the surface of the inspection object travels back along the optical path along which the inspection light travels before being incident on the surface of the inspection object, and interferes with the reference light.

11. The interferometer according to claim 1, wherein the interferometer is a Fizeau interferometer or a Twyman-Green interferometer.

12. A shearing interferometer that measures the shape of a surface of an inspection object, the interferometer comprising:
  an interference optical system arranged along an optical axis thereof, the interference optical system causing light from a light source to be incident on the surface of the inspection object, the interference optical system splitting the light from the light source reflected by the surface of the inspection object into a plurality of split light beams, the interference optical system causing the plurality of split light beams to interfere with each other, the interference optical system displacing the plurality of split light beams in a direction perpendicular to the optical axis;

a photoelectric conversion element that detects interference fringes produced by the interference of the plurality of split light beams, wherein the interference optical system includes a first optical element that transmits and reflects the light from the light source, a second optical element that reflects the light from the light source and has a flat reflecting surface, a moving unit configured to move the second optical element, wherein the light from the light source passes through the first optical element, is reflected by the second optical element, is reflected by the first optical element, and is then incident on the surface of the inspection object, and wherein the inspection light reflected by the surface of the inspection object is reflected by the first optical element, is reflected by the second optical element, passes through the first optical element, and interferes with the reference light.

13. A method of measuring light reflected off of a surface of an inspection object with an interferometer to determine the shape of the surface, the method comprising:

splitting light from a light source into inspection light and reference light, and causing the inspection light to be reflected by the surface of the inspection object such that the inspection light reflected by the surface of the inspection object and the reference light interfere with each other;

detecting interference fringes produced by the interference of the inspection light and the reference light, and calculating a phase relationship of the interference fringes to determine the shape of the surface of the inspection object, wherein the inspection light is transmitted from the optical source through an interference optical system that includes a first optical element that transmits and reflects the inspection light, a second optical element that reflects the inspection light and has a flat reflecting surface, and a moving unit that moves the second optical element, wherein the inspection light passes through the first optical element, is reflected by the second optical element, is reflected by the first optical element, and is then incident on the surface of the inspection object, and wherein the inspection light reflected by the surface of the inspection object is reflected by the first optical element, is reflected by the second optical element, passes through the first optical element, and interferes with the reference light.

* * * * *